US012675033B2

(12) United States Patent
Luo et al.

(10) Patent No.: US 12,675,033 B2
(45) Date of Patent: Jul. 7, 2026

(54) SHOCK ABSORPTION MECHANISM

(71) Applicant: TILTA INC., Burbank, CA (US)

(72) Inventors: Yaolong Luo, Shenzhen (CN); Yiling Wang, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/753,363

(22) Filed: Jun. 25, 2024

(65) Prior Publication Data

US 2025/0102889 A1     Mar. 27, 2025

(30) Foreign Application Priority Data

Sep. 21, 2023    (CN) .......................... 202322580710.3

(51) Int. Cl.
| | |
|---|---|
| *G03B 17/56* | (2021.01) |
| *F16M 13/02* | (2006.01) |
| *H02P 23/00* | (2016.01) |

(52) U.S. Cl.
CPC ........... *G03B 17/561* (2013.01); *F16M 13/02* (2013.01); *H02P 23/0004* (2013.01)

(58) Field of Classification Search
CPC .... G03B 17/561; F16M 13/02; H02P 23/0004
USPC ........................................................ 248/636
See application file for complete search history.

(56) References Cited

U.S. PATENT DOCUMENTS

| | | | | | |
|---|---|---|---|---|---|
| 4,522,304 | A | * | 6/1985 | Dean, II ................ | F16F 3/0876 |
| | | | | | 206/521 |
| 5,710,945 | A | * | 1/1998 | Thompson ............. | B64D 47/08 |
| | | | | | 396/7 |
| 6,513,769 | B1 | * | 2/2003 | Chapman .............. | F16F 15/073 |
| | | | | | 248/125.1 |
| 6,579,016 | B2 | * | 6/2003 | Chapman ............... | F16M 11/18 |
| | | | | | 396/428 |

(Continued)

FOREIGN PATENT DOCUMENTS

WO      WO-2021253287 A1 * 12/2021   ............. B64U 50/19

*Primary Examiner* — Monica E Millner
(74) *Attorney, Agent, or Firm* — LOZA & LOZA, LLP; Derek W. Yeung

(57)     ABSTRACT

A shock absorption mechanism includes connectors, supporting components, and shock absorption components capable of driving the supporting components to swing back and forth or left and right. The connectors are clamped in the middle of the shock absorption components and are operatively connected to the shock absorption components on both sides. The supporting components are movably connected to the shock absorption components, and the lower end of the connectors is operatively connected to the supporting components. A notable feature of this invention, distinct from existing technologies, is the shock absorption components' capacity to induce front-back or left-right oscillations in the supporting components through their inherent rotation when detecting a tendency for swinging. This proactive response effectively mitigates the centrifugal force resulting from camera swinging, preventing detachment between the camera and the damping arm and averting camera jitter. Consequently, the stability of the recorded footage is assured.

12 Claims, 5 Drawing Sheets

(56)                    References Cited

U.S. PATENT DOCUMENTS

| | | | |
|---|---|---|---|
| 7,264,212 B2 * | 9/2007 | Hung | F16M 11/10 |
| | | | D14/452 |
| 7,303,341 B2 * | 12/2007 | Itzkowitz | G03B 17/561 |
| | | | 396/428 |
| 7,663,040 B1 * | 2/2010 | Hsieh | G10D 13/063 |
| | | | 84/421 |
| 8,226,053 B2 * | 7/2012 | Yu | H04R 1/021 |
| | | | 248/447 |
| 9,208,761 B2 * | 12/2015 | Miyajima | G10D 13/28 |
| 9,299,328 B2 * | 3/2016 | Steinhauser | G10D 13/063 |
| 2004/0251389 A1 * | 12/2004 | Oddsen, Jr. | F16M 11/24 |
| | | | 248/279.1 |
| 2006/0269278 A1 * | 11/2006 | Kenoyer | F16M 13/02 |
| | | | 396/428 |
| 2007/0160364 A1 * | 7/2007 | Peika | F16M 13/02 |
| | | | 396/428 |
| 2012/0081670 A1 * | 4/2012 | Greaves | F16M 13/04 |
| | | | 248/371 |
| 2012/0263445 A1 * | 10/2012 | Beasley | F16M 13/02 |
| | | | 396/428 |
| 2023/0095802 A1 * | 3/2023 | Hwang | F16M 11/046 |
| | | | 248/543 |
| 2024/0064403 A1 * | 2/2024 | Wang | H04N 23/51 |

* cited by examiner

12

11

13

14

SHOCK ABSORPTION MECHANISM

CROSS-REFERENCE TO RELATED APPLICATIONS

The present application for patent claims priority to and the benefit of pending Chinese Application No. 2023225807103, filed Sep. 21, 2023, and hereby expressly incorporated by reference herein as if fully set forth below in its entirety and for all applicable purposes.

TECHNICAL FIELD

The present disclosure is applicable to shock absorption technology for devices like in-vehicle filming equipment, particularly involving a shock absorption mechanism.

INTRODUCTION

In the realm of capturing dynamic scenes with vehicle-mounted filming devices, whether in indoor or outdoor settings, the utilization of auxiliary tools and equipment such as vehicle-mounted camera support structures are commonplace. These structures, employed for filming moving vehicles or similar scenarios, secure the camera to the vehicle, ensuring precise synchronization with the filming scene. Nevertheless, the variable conditions of the road surface can introduce disturbance to both the camera and the vehicle-mounted support structure, resulting in undesired motion-induced camera shake during filming.

The camera is inevitably subject to shaking and lateral inertia, posing difficulties in maintaining precise control over the camera's stability and preventing detachment at the head of the vehicle-mounted camera support structures.

BRIEF SUMMARY

To address the aforementioned challenges, an objective of the present disclosure is to introduce a shock absorption mechanism, meticulously designed to mitigate the centrifugal force induced by the swinging tendency of the supporting component. This is accomplished through the autonomous rotation and actuation of the supporting component, facilitating controlled oscillations in both lateral and longitudinal directions, thereby preventing detachment between a camera and a damping arm. Furthermore, the invention aims to eradicate camera jitter and guarantee the utmost stability in the captured footage.

To achieve the above purpose, the technical solution of the present disclosure is outlined as follows:

a shock absorption mechanism, comprising:

connectors;

supporting components, with movable connections to the connectors;

a plurality of shock absorption components are present, with connectors positioned between two of them and operatively connected to shock absorption components on both sides. One end of the shock absorption components, away from the connectors, is movably connected to the supporting components to drive their movement.

Within this application, the supporting component serves as a mounting platform for devices requiring shock-absorbing, such as cameras, while the connector is instrumental in linking structures like vehicle-mounted camera support structures or damping arms. The shock absorption component, plays a pivotal role in providing rotational buffering and shock absorption functions. During the filming process, when the camera manifests horizontal jitter and inertial movement, leading to a swinging tendency, the supporting component reacts by swaying in response to the camera's influence. Simultaneously, the shock absorption component discerns this swinging tendency, triggering autonomous rotation based on the detection result. It subsequently propels the supporting component and the camera to oscillate back and forth or left and right in alignment with the connector. This orchestrated movement effectively buffers the centrifugal force generated by the camera's swinging, averting detachment between the camera and the damping arm, camera jitter, and thereby ensuring the unwavering stability of the captured footage. Simultaneously, the bottom of the connector is operatively connected to the supporting component, and the upper sides are operatively connected to the shock absorption components, providing greater freedom of movement to ensure that the supporting component swings back and forth or left and right without interference.

Furthermore, the connector includes a connecting body, the connecting body being equipped with a first connecting portion, with the shock absorption components operatively connected to both sides of the connecting body. One end of the first connecting portion, away from the connecting body, is operatively connected to the supporting component. In this application, the shock absorption component is equipped with a plurality of sets strategically positioned on both the left and right sides of the first connecting part. These sets possess the capacity to freely mobilize the supporting component through their rotational motion. As the shock absorption components rotate backward, they generate tension, while forward rotation provides thrust. When the shock absorption components on both sides rotate at identical speeds and in the same direction, they collaboratively induce controlled oscillations in the supporting component, effectively buffering the centrifugal force resulting from the camera's forward and backward movement. Conversely, when the shock absorption components on both sides rotate at identical speeds but in opposite directions, they cooperatively drive the supporting component to flip, thereby buffering the flipping centrifugal force stemming from the camera's shake. The synchronization of varying tension or thrust in these scenarios ensures lateral oscillation of the supporting component, effectively buffering the camera's arbitrary-angle swinging and upholding the stability of the camera's captured footage.

Furthermore, the shock absorption components comprise shock absorption members and transmission members. the shock absorption member rotationally connects to the connector and movably connects to the transmission member; and one end of the transmission member, distal from the shock absorption member, connecting movably to the supporting components to drive movement of the supporting component.

Furthermore, the shock absorption member comprises a rotating part and a fixed part; the fixed part being connected to the connector and being rotationally connected to the rotating part; and the rotating part is rotationally connected to the transmission member, propelling motion of the transmission member as the rotating part rotates.

Furthermore, the shock absorption mechanism additionally encompasses a plurality of transmission shafts. Two of these transmission shafts are individually movably connected to the ends of the transmission member, establishing mobile connections with both the shock absorption component and the supporting components. This ensures seamless transmission links between the transmission member and the shock absorption component and supporting components on both sides, respectively.

Furthermore, the shock absorption component exhibits an outer periphery housing a first drive shaft seat, while the supporting component is equipped with a second drive shaft seat. The two terminations of the transmission member establish mobile connections with the first and second drive shaft seats through the shafts, respectively.

Furthermore, the damping mechanism further includes a movable axle, which comprises a first axle part and a second axle part, and the supporting component features a supporting hinge seat. The first connecting portion, away from the connecting body, is rotatably connected to the first axle part, and the supporting hinge seat is rotatably connected to the second axle part, so that the first connecting portion is operatively connected to the supporting component.

Furthermore, the second drive shaft seat comprises a plurality of units, with two units situated at both ends of the supporting component. The supporting hinge seat is strategically positioned along the midpoint between the two second drive shaft seats. Within this application, the lower end of the first connecting portion establishes a movable connection to the supporting component through the movable axle. This operational feature enables relative movement between the supporting component and the second connecting portion under the impetus of the rotating component, thereby achieving effective buffering. Notably, the placement of the movable axle above the supporting component minimizes the impact of tension and thrust generated during the movement of the connector on the supporting component. This design consideration ensures structural stability and eliminates interference during the movement or rotation of the connector.

Furthermore, the fixed part's central region is fitted with a through-hole, while the rotating part comprises a protrusion, which is inserted into the through-hole of the fixed component, establishing a pivotal connection; and the rotating part incorporates a bearing, and a pivot is rotationally linked to the fixed part through the bearing.

Moreover, the rotating part includes a magnetic encoder and an encoding magnet. The fixed part is rigidly affixed with a coil, and internally, the rotating part houses a magnet aligning with the coil. The magnet encompasses the outer perimeter of the coil. Positioned on one side of the fixed part, the magnetic encoder collaborates with the encoding magnet, which is rigidly affixed with the rotating part, and on the side distanced from the rotating part, the fixed part is equipped with an anti-detachment device. The encoding magnet is securely embedded within the anti-detachment device, with the device rigidly connected to the pivot. This application leverages the principles of a brushless motor, wherein the coil and magnet cooperation, driven by electromagnetic inductive, instigates the rotation of the rotating part, effecting movement in the supporting component relative to the first connecting part. This dynamic interaction efficiently buffers the inherent shaking tendency of the supporting component, providing a discernible damping effect. Furthermore, during operation, if the camera-induced shake causes the supporting component to deviate, the supporting component imparts a deviation trend to the rotating part. In such instances, the magnetic encoder detects the shaking angular velocity of the rotating part through the encoding magnet, transmitting this information to the microcontroller. The microcontroller, employing a PID algorithm, computes the voltage corresponding to the torque generated by the motor, subsequently directing the coil to generate the requisite torque based on this voltage. This orchestrated action propels the rotating part, mitigating the camera shake. To ensure synchronous rotation, the anti-detachment device, affixed by screws to the left end of the pivot, prevents the encoding magnet from detaching, thereby allowing the magnetic encoder to accurately monitor the rotating angular velocity of the rotating part.

Moreover, mounting grooves are positioned on the left and right sides of the first connecting portion, where the fixed part is secured on one side near the first connecting portion within these mounting grooves.

Moreover, both the movable axle and the lower transmission pivot are engineered as cross-axle pivots, endowing them with the capacity for both front-back and left-right rotation. This characteristic facilitates flexible transmission functions within the structure.

A notable feature of this disclosure, distinct from existing technologies, is the shock absorption components' capacity to induce front-back or left-right oscillations in the supporting components through their inherent rotation when detecting a tendency for swinging. This proactive response effectively mitigates the centrifugal force resulting from camera swinging, preventing detachment between the camera and the damping arm and averting camera jitter. Consequently, the stability of the recorded footage is assured.

REFERENCE NUMERALS USED IN THE FIGURES

1. Connector, 11. Connecting body, 12. Fixed collar, 13. articulated shaft seat, 14. Installation groove.
2. Supporting component, 21. First lower transmission pivot seat, 22. Second lower transmission pivot seat, 23. Supporting hinge seat.
3. Shock absorption component, 31. First shock absorption component, 311. First rotating assembly, 3111. First rotating component (rotating part), 3112. First fixed component (fixed part), 3113. First magnetic encoder, 3114. First encoding magnet, 3115. First coil, 3116. First magnet (motor magnet), 3117. First upper transmission pivot seat, 3118. First shaft, 3119. First anti-detachment device, 312. First transmission member, 3121. First upper transmission pivot (shaft), 3122. First transmission bar, 3123. First lower transmission pivot (shaft). 32. Second shock absorption component, 321. Second rotating assembly, 3211. Second rotating component, 3212. Second fixed component, 3213. Second magnetic encoder, 3214. Second encoding magnet, 3215. Second coil, 3216. Second magnet (motor magnet), 3217. Second upper transmission pivot seat, 3218. Second shaft, 3219. Second anti-detachment device, 322. Second transmission member, 3221. Second upper transmission pivot, 3222. Second transmission bar, 3223. Second lower transmission pivot.

4. Camera.

5. Movable axle; 51. First axle part; 52. Second axle part.

6. through-hole.

7. bearing.

DETAILED DESCRIPTION

In the pursuit of clarity regarding the objectives, technical solutions, and advantages of the present disclosure, a detailed description is offered alongside corresponding embodiments and accompanying illustrations. It is crucial to note that the specific embodiments presented here are intended for explanatory purposes only and do not impose limitations on the scope of the present disclosure.

Figure 1:
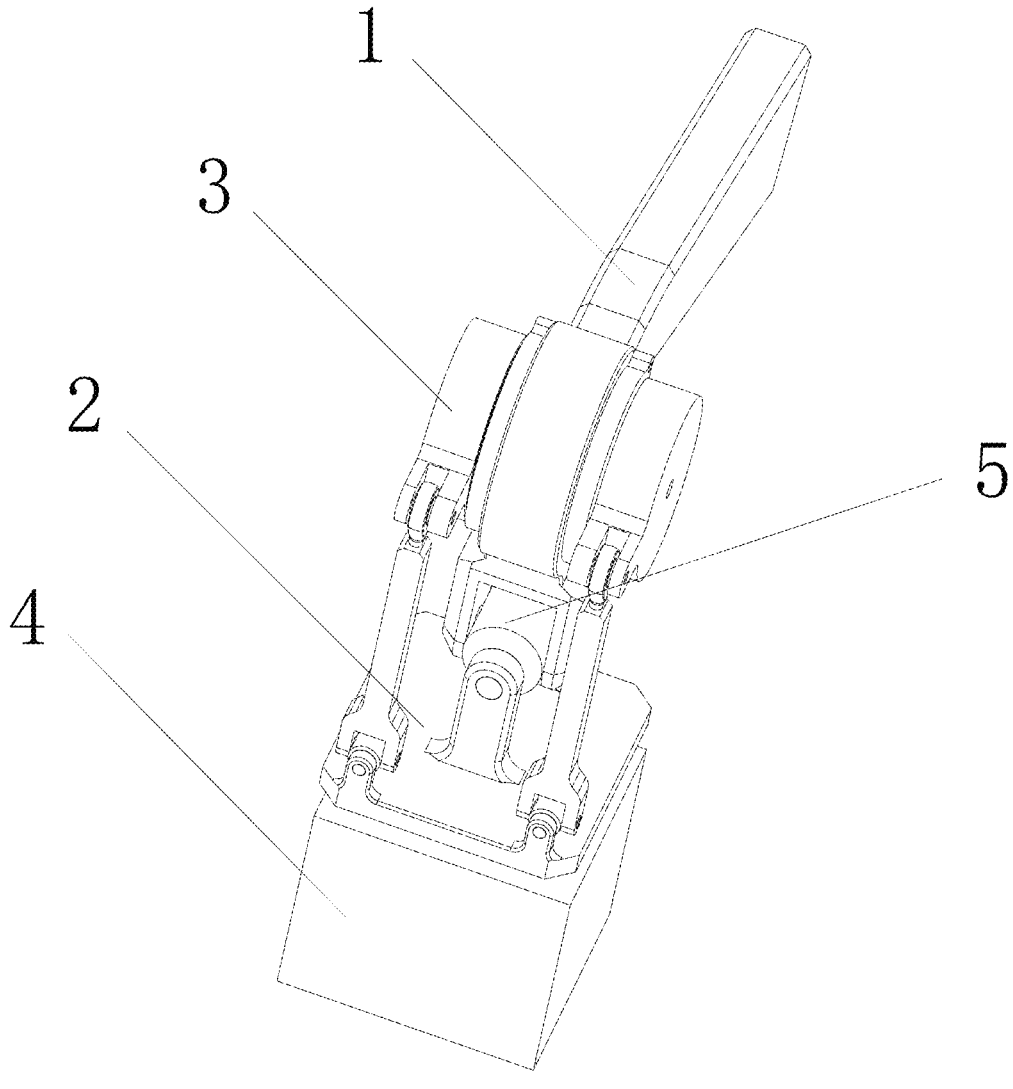
FIG. 1 is an axonometric view of an exemplary embodiment.
Figure 2:
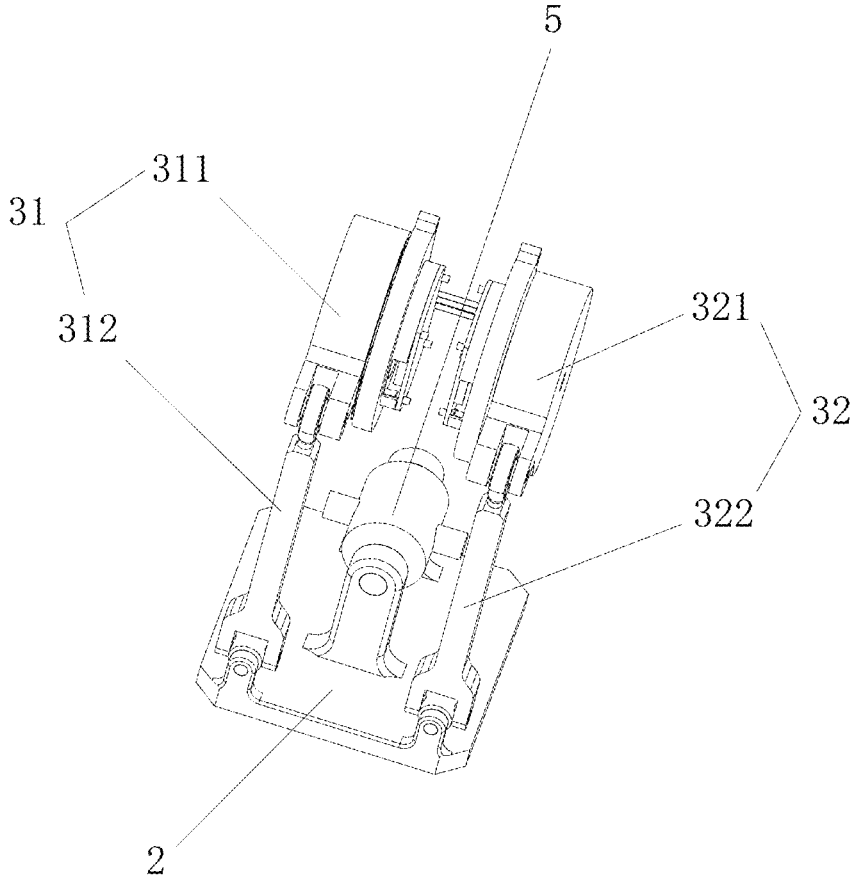
FIG. 2 is a schematic diagram of the assembled state of a supporting component, a shock absorption component, and a movable axle in the exemplary embodiment.
Figure 3:
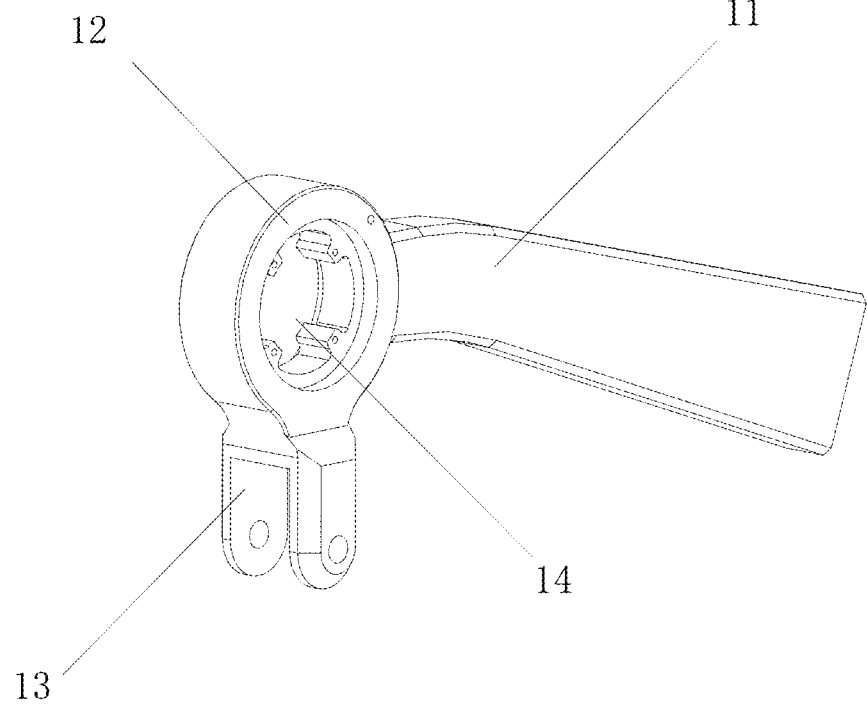
FIG. 3 is a schematic diagram of a connector in the exemplary embodiment.
Figure 4:
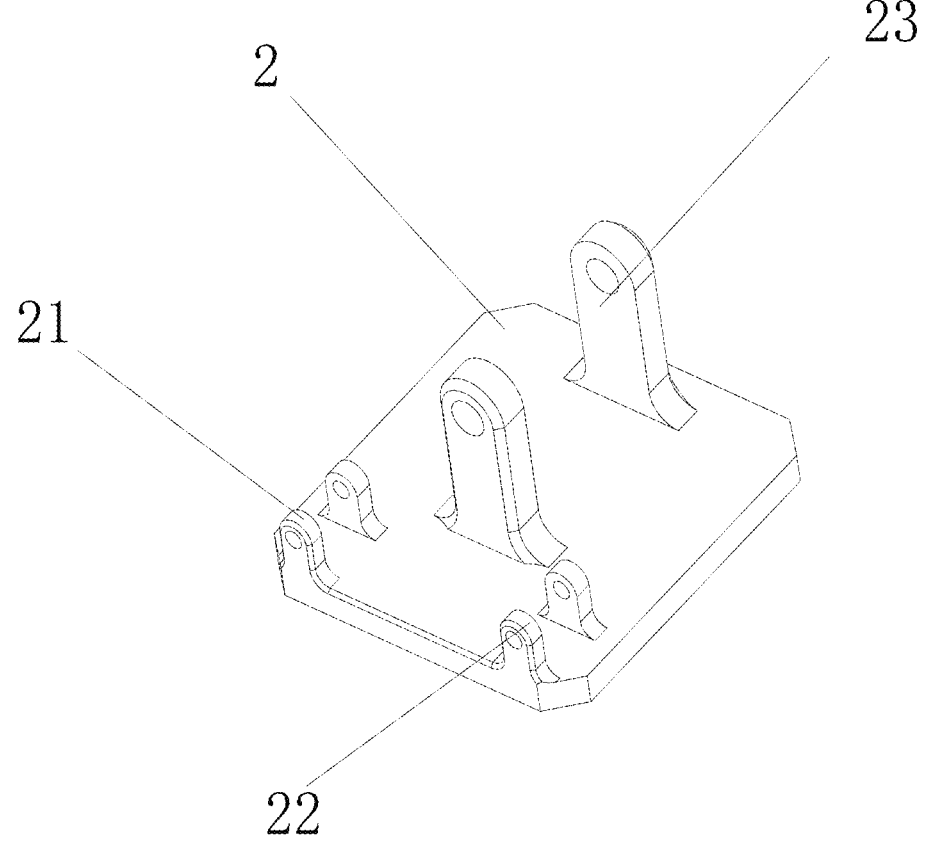
FIG. 4 is a schematic diagram of the supporting component in the exemplary embodiment.
Figure 5:
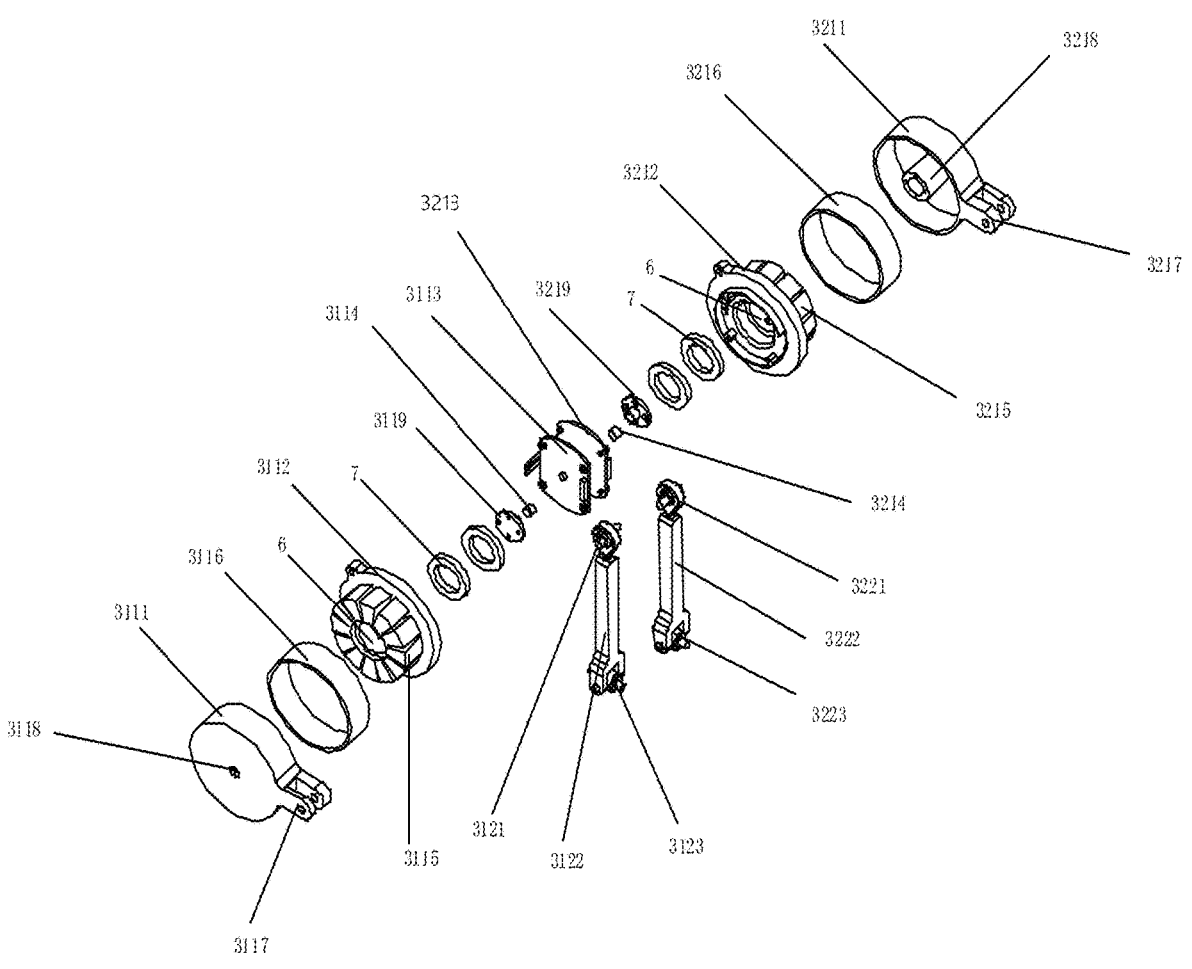
FIG. 5 is an exploded view of the shock absorption component in the exemplary embodiment.

To fulfill the stated objectives, the technical solution of an exemplary embodiment is outlined as follows:

Referencing FIGS. 1-5, an embodiment introduces a damping mechanism, comprising: a connector 1; a supporting component 2, establishing a movable connection with the connector 1.

The damping mechanism further includes a shock absorption component 3 that comprises a first shock absorption component 31 and a second shock absorption component 32. The connector 1 is positioned between the first shock absorption component 31 and the second shock absorption component 32, being operatively connected to both. One end of the first shock absorption component 31 and the second shock absorption component 32, away from the connector 1, is movably connected to the supporting component 2, thus driving its movement. In this embodiment, the supporting component 2 serves as a mounting platform for the camera 4, while the connector 1 is instrumental in linking to structures like vehicle-mounted camera support structures or damping arms. The shock absorption component 3, plays a pivotal role in providing rotational damping and shock absorption functions. During the filming process, when the camera exhibits horizontal jitter and inertial movement, causing the camera 4 to become unbalanced, the supporting component 2 reacts by swaying in response to the camera's movement. Simultaneously, the shock absorption component 3 discerns this swinging tendency of the supporting component 2, triggering autonomous rotation in advance based on the detection result. It subsequently propels the supporting component 2 and the camera 4 to oscillate back and forth or left and right in alignment with the corresponding directions (e.g. opposite directions). This orchestrated movement effectively buffers or dampens the centrifugal force generated by the camera 4's swinging, averting camera 4's jitter, and thereby ensuring the unwavering stability of the captured footage. Simultaneously, the bottom of the connector 1 is operatively connected to the supporting component 2, while the upper sides are connected to the shock absorption components 3, allowing for greater freedom of movement to ensure that the supporting component 2 swings back and forth or left and right without interference.

Moreover, the connector 1 encompasses a connecting body 11, whose front end is equipped with a fixed collar 12. The first shock absorption component 31 and the second shock absorption component 32 are strategically positioned on the left and right sides of the fixed collar 12, respectively. The lower ends of the first shock absorption component 31 and the second shock absorption component 32 are respectively linked to the supporting component 2 for power and/or motion transmission. The lower end of the fixed collar 12 is fitted with an articulated shaft seat 13, whose lower end is operatively connected to the supporting component 2. In this embodiment, the first shock absorption component 31 and the second shock absorption component 32 are respectively positioned on the left and right sides of the fixed collar 12. The first shock absorption component 31 and the second shock absorption component 32 possess the capacity to freely mobilize the supporting component 2 through their rotational motion. When the rotation speeds and directions of the first shock absorption components 31 and the second shock absorption component 32 are synchronized (e.g., Turning upwards at the same speed or downwards at the same speed), they jointly propel the supporting component 2 to oscillate back and forth, effectively buffering or dampening the centrifugal force resulting from the forward and backward movements of the camera 4. When there is a difference in the motion of the first shock absorption component 31 and the second shock absorption component 32 (e.g., different speeds, different directions), they collaboratively induce other directions of swinging of the supporting component 2, mitigating the flipping centrifugal force stemming from the camera 4's shaking. This mechanism achieves automatic spatial movement of the supporting component 2, adeptly buffering or dampening the camera 4's shake at any angle, thereby ensuring the stability of the camera 4 during filming.

Moreover, the first shock absorption component 31 comprises a first rotating assembly 311 and a first transmission member 312. The first rotating assembly 311 includes a first rotating component 3111, a first fixed component 3112, a first magnetic encoder 3113, and a first encoding magnet 3114. The first fixed component 3112 is securely connected to the fixed collar 12 and rotationally linked to the first rotating component 3111. The first rotating component 3111 houses the first magnet 3116, which is correspondingly matched with and encircles the outside of the first coil 3115, and fixed on the first fixed component 3112. Positioned on one side of the first fixed component 3112, the first magnetic encoder 3113 cooperates with the first encoding magnet 3114, which is securely connected to the first rotating component 3111. The outer side of the first rotating component 3111 is also equipped with a first upper transmission pivot seat 3117, directly below which the supporting component 2 is located, featuring a first lower transmission pivot seat 21. The first transmission member 312 includes a first upper transmission pivot 3121, a first transmission bar 3122, and a first lower transmission pivot 3123. The first upper transmission pivot 3121 is rotatably connected to the first upper transmission pivot seat 3117 and rigidly connected to the upper end of the first transmission bar 3122. The first lower transmission pivot 3123 is rotatably connected to the lower end of the first transmission bar 3122 and the first lower transmission pivot seat 21. In this embodiment, leveraging the principles of a brushless motor, the cooperation between the first coil 3115 and the first magnet 3116, driven by electromagnetic inductive, instigates the rotation of the first rotating component 3111, effecting movement in the supporting component 2 relative to the connecting collar 12 via the first transmission member 312. This dynamic interaction efficiently buffers or dampens the inherent shaking tendency of the supporting component 2, providing a discernible damping effect. Additionally, during operation, if the camera-induced shake causes the supporting component 2 to deviate, the supporting component 2 imparts a deviation trend to the rotating component. In such instances, the magnetic encoder 3113 detects the shaking angular velocity of the first rotating component 3111 through the first encoding magnet 3114, transmitting this information to a microcontroller. In some aspects, the microcontroller, employing a PID algorithm, computes the voltage corresponding to the torque generated by the motor, subsequently directing the coil to generate the requisite torque based on this voltage. This orchestrated action propels the rotating component to mitigate the camera 4's shake.

Moreover, a through-hole 6 is positioned in the middle of the first fixed component 3112, and a first shaft 3118 (e.g., a protrusion) is situated on the first rotating component 3111. The first shaft 3118 fits into the through-hole 6 of the first fixed component 3112. Internally, the first rotating component 3111 is equipped with a bearing 7, allowing the first shaft 3118 to rotate relative to the first fixed component 3112 and the fixed collar 12, thereby enhancing the stability of the structure.

Additionally, on the side of the first fixed component 3112 facing away from the first rotating component 3111, a first anti-detachment device 3119 is positioned, with the first encoding magnet 3114 securely fixed within it. The first anti-detachment device 3119 is firmly connected to the first shaft 3118, attached to the left end of the first shaft 3118 with screws. This configuration prevents any detachment of the first encoding magnet 3114 from the first shaft 3118, ensuring synchronous rotation and allowing the first magnetic encoder 3113 to accurately monitor the rotational angular velocity of the first rotating component 3111.

Moreover, the second shock absorption component 32 comprises a second rotating assembly 321 and a second transmission member 322. The second rotating assembly 321 encompasses a second rotating component 3211, a second fixed component 3212, a second magnetic encoder 3213, and a second encoding magnet 3214. The second fixed component 3212 is rigidly connected to the second connecting body 12 and rotationally linked to the second rotating component 3211. The second rotating component 3211 houses the second magnet 3216, which is correspondingly matched with and encircles the outside of the second coil 3215, fixed on the second fixed component 3212. Positioned on one side of the second fixed component 3212, the second magnetic encoder 3213 cooperates with the second encoding magnet 3214, which is securely connected to the second rotating component 3211. The outer side of the second rotating component 3211 is also equipped with a second upper transmission pivot seat 3217, directly below which the supporting component 2 is located, featuring the second lower transmission pivot seat 22. The second transmission member 322 includes a second upper transmission pivot 3221, a second transmission bar 3222, and a second lower transmission pivot 3223. The second upper transmission pivot 3221 is rotatably connected and fixed to the second upper transmission pivot seat 3217 and firmly attached to the upper end of the second transmission bar 3222. The second lower transmission pivot 3223 is rotatably connected to the lower end of the second transmission bar 3222 and the second lower transmission pivot seat 22. In this embodiment, leveraging the principles of a brushless motor, the cooperation between the second coil 3215 and the second magnet 3216, driven by electromagnetic inductive, instigates the rotation of the second rotating component 3211, effecting movement in the supporting component 2 relative to the fixed collar 12 via the second transmission member 322. This dynamic interaction efficiently buffers and dampens the inherent shaking tendency of the supporting component 2, providing a discernible damping effect. The upper and lower ends of the transmission bar are both of movable connections, which provide a high degree of flexibility and make it easier to adjust the supporting component 2. Additionally, during operation, if the camera-induced shake causes the supporting component 2 to deviate, the supporting component 2 imparts a deviation trend to the rotating component. In such instances, the magnetic encoder 3213 detects the shaking angular velocity of the second rotating component 3211 through the second encoding magnet 3214, transmitting this information to the microcontroller. The microcontroller, employing a PID algorithm, computes the voltage corresponding to the torque generated by the motor, subsequently directing the coil to generate the requisite torque based on this voltage. This orchestrated action propels the rotating component, mitigating the camera 4's shake.

Moreover, a through-hole 6 is positioned in the middle of the second fixed component 3212, and a second shaft 3218 is situated on the second rotating component 3211. The second shaft 3218 fits into the through-hole 6 of the second fixed component 3212. Internally, the second rotating component 3211 is equipped with a bearing 7, allowing the second shaft 3218 to rotate relative to the second fixed component 3212 and the fixed collar 12, thereby enhancing the stability of the structure.

Furthermore, the second fixed component 3212 is equipped with a second anti-detachment device 3219 on the side opposite the second rotating component 3211. The second encoding magnet 3214 is securely positioned within the second anti-detachment device 3219, and the second anti-detachment device 3219 is firmly connected to the second shaft 3218. By fastening the second anti-detachment device 3219 to the left end of the second shaft 3218 using screws, any unintended detachment of the second encoding magnet 3214 from the second shaft 3218 is prevented. This design ensures the synchronous rotation of the second encoding magnet 3214 with the second shaft 3218, enabling the second magnetic encoder 3213 to accurately monitor the rotational angular velocity of the second rotating component 3211.

Moreover, the first lower transmission pivot seat 21 and the second lower transmission pivot seat 22 are positioned on the left and right sides of the supporting component 2, respectively. The supporting component 2 also incorporates a supporting hinge seat 23, centrally located between the first lower transmission pivot seat 21 and the second lower transmission pivot seat 22. The shock absorption mechanism includes a movable axle 5 (comprises a first axle 51 part and a second axle part 52), securely clamped between the first shock absorption component 31 and the second shock absorption component 32. The front and back end of the movable axle 5 is rotationally connected to the supporting hinge seat 23, while the left and right end of the movable axle 5 is linked to the supporting hinge seat rotationally. In this embodiment, articulated shaft seat 13 is movably linked to the supporting component 2 through the movable axle 5, allowing the supporting component 2 to move relative to articulated shaft seat 13 under the influence of the first rotating component 3111 and the second rotating component 3211, thereby achieving effective buffering and damping. Additionally, the placement of the movable axle 5 above the supporting component 2 minimizes the impact of tension and thrust generated during the movement of the connector 1 on the supporting component 2. This design consideration ensures structural stability and eliminates interference during the movement or rotation of the connector 1.

Furthermore, installation grooves 14 are positioned on the left and right sides of the fixed collar 12, with the first and second fixed components 3112 and 3212 being fixed on one side near the fixed collar 12 within these installation grooves 14.

Additionally, the movable axle 5, the first lower transmission pivot 3123, and the second lower transmission pivot 3223 all utilize a cross-axle pivot. This type of pivot incorporates mutually perpendicular first and second axes, imparting front-back as well as left-right rotation functions, thereby achieving flexible transmission functions within the structure.

It is important to note that the above represents an exemplary embodiment of the present disclosure and should not be construed as limiting. Any modifications, equivalents, and enhancements made within the spirit and principles of the present disclosure are encompassed within the scope of the disclosure.

What is claimed is:

1. A shock absorption mechanism, comprising:
a connector;
a supporting component, movably connected to the connector; and
a plurality of shock absorption components, the connector positioned between two shock absorption components of the plurality of shock absorption components and operatively connected to the shock absorption components on two sides of the connector,
wherein at least one of the two shock absorption components comprises a coil and a motor magnet configured to generate torque based on a deviation of the supporting component; and
wherein one end of each of the plurality of shock absorption components, away from the connector, is movably connected to the supporting component to apply the torque to dampen the supporting component.

2. The shock absorption mechanism according to claim 1, wherein the connector comprises a connecting body,
the connecting body comprises a first connecting portion, with a first one of the plurality of shock absorption components movably connected to a first side of the connecting body, and a second one of the plurality of shock absorption components movably connected to a second side of the connecting body; and
one end of the first connecting portion, away from the connecting body, is movably connected to the supporting component.

3. The shock absorption mechanism according to claim 2, wherein each of the plurality of shock absorption components comprises a shock absorption member and a transmission member;
the shock absorption member rotationally connects to the connector and movably connects to the transmission member; and
one end of the transmission member, distal from the shock absorption member, connects movably to the supporting components to drive movement of the supporting component.

4. The shock absorption mechanism according to claim 3, wherein the shock absorption member comprises a rotating part and a fixed part;
the fixed part is connected to the connector and being rotationally connected to the rotating part; and
the rotating part is rotationally connected to the transmission member, configured to propel motion of the transmission member as the rotating part rotates.

5. The shock absorption mechanism according to claim 3, wherein the shock absorption mechanism comprises a plurality of transmission pivots; and
two of the plurality of transmission pivots are individually movably connected to two ends of the transmission member, and the two of the plurality of transmission pivots are movably connected to the shock absorption member and the supporting component, respectively.

6. The shock absorption mechanism according to claim 5, wherein the shock absorption member comprises a first transmission pivot seat at an outer periphery of the shock absorption member,
the supporting component is equipped with a second transmission pivot seat; and
two ends of the transmission member are respectively connected to the first transmission pivot seat and the second transmission pivot seat through the plurality of transmission pivots.

7. The shock absorption mechanism according to claim 6, further comprising a movable axle with a first axle part and a second axle part;
wherein the supporting component is provided with a supporting hinge seat, and one end of the first connecting portion, away from the connecting body, is rotatably connected to the first axle part, and the supporting hinge seat is rotatably connected to the second axle part, thereby establishing an articulated connection between the first connecting portion and the supporting component.

8. The shock absorption mechanism according to claim 7, wherein the second transmission pivot seat comprises two second transmission pivot seats, situated at respective ends of the supporting component; and
the supporting hinge seat is positioned along a midpoint between the two second transmission pivot seats.

9. The shock absorption mechanism according to claim 4, wherein a central region of the fixed part is provided with a through-hole, while the rotating part comprises a shaft, which is inserted into the through-hole of the fixed part; and
the rotating part incorporates a bearing, and the shaft is rotationally linked to the fixed part through the bearing.

10. The shock absorption mechanism according to claim 4, wherein:
the fixed part comprises the coil, corresponding to the motor magnet in the rotating part; and
the motor magnet encompasses an outer perimeter of the coil.

11. The shock absorption mechanism according to claim 10, wherein:
the fixed part is provided with a magnetic encoder, the rotating part is provided with an encoding magnet, the magnetic encoder collaborates with the encoding magnet.

12. The shock absorption mechanism according to claim 11, wherein:
the fixed part is equipped with an anti-detachment device; and
the encoding magnet is securely embedded within the anti-detachment device, which is rigidly connected to a pivot.

\* \* \* \* \*